(12) United States Patent
Gerner

(10) Patent No.: US 7,399,345 B2
(45) Date of Patent: Jul. 15, 2008

(54) CAPILLARY FLOW RESTRICTOR APPARATUS

(75) Inventor: Yuri Gerner, Mendota Heights, MN (US)

(73) Assignee: Rheodyne LLC, Rohnert Park, CA (US)

( * ) Notice: Subject to any disclaimer, the term of this patent is extended or adjusted under 35 U.S.C. 154(b) by 108 days.

(21) Appl. No.: 11/430,711

(22) Filed: May 9, 2006

(65) Prior Publication Data

US 2007/0261553 A1    Nov. 15, 2007

(51) Int. Cl.
*B01D 19/00* (2006.01)
*B01D 53/22* (2006.01)

(52) U.S. Cl. .................. 96/6; 96/10; 96/193; 95/46
(58) Field of Classification Search .............. 96/6, 96/8, 10, 193; 95/46, 266; 417/295, 441
See application file for complete search history.

(56) References Cited

U.S. PATENT DOCUMENTS

| 5,340,384 | A  | * | 8/1994  | Sims .............................. 96/6    |
| 6,071,085 | A  | * | 6/2000  | Bernhardt .................... 417/251      |
| 6,248,157 | B1 | * | 6/2001  | Sims et al. ....................... 96/6    |
| 6,309,444 | B1 | * | 10/2001 | Sims et al. ..................... 95/46     |
| 6,494,938 | B2 | * | 12/2002 | Sims et al. ....................... 96/6    |
| 6,675,835 | B2 | * | 1/2004  | Gerner et al. ................. 138/30      |

* cited by examiner

*Primary Examiner*—Duane Smith
*Assistant Examiner*—Douglas J Theisen
(74) *Attorney, Agent, or Firm*—Haugen Law Firm PLLP

(57) ABSTRACT

A pump for use in operably evacuating a chamber in a vacuum degassing apparatus includes one or more pumping cavities that are in fluid communication with the chamber, and a continuous vent channel that has an outlet disposed in fluid communication with a respective one of the one or more pumping cavities. The vent channel is configured to provide dilution gas flow into the pumping cavity of the pump at a rate sufficient to prevent solvent condensation in the pumping cavity during operation of the pump in liquid degassing applications.

14 Claims, 3 Drawing Sheets

CAPILLARY FLOW RESTRICTOR APPARATUS

FIELD OF THE INVENTION

The present invention relates to vacuum degassing systems generally, and more particularly to a vacuum degassing system that incorporates a pump for evacuating a chamber through which liquid to be degassed is conveyed, wherein the pump is vented through a continuous vent channel.

BACKGROUND OF THE INVENTION

Degassing of liquid solvents is an operation utilized in a variety of applications. A particular example of such an application is in the degassing of the mobile phase in a liquid chromatography system, where the presence of even small amounts of dissolved gases can interfere with the accuracy and sensitivity of the results obtained. Moreover, if the dissolved species is chemically active, as in the case of oxygen and air, such species can additionally produce unwanted changes or deterioration in the mobile phase itself.

Techniques for degassing liquid materials have included heating or boiling the liquid to be degassed, exposing the material to a reduced pressure environment or vacuum and using combinations of heat and vacuum to reduce the amount of dissolved gases in the liquid. In addition, vacuum degassing through a membrane apparatus has been accomplished by utilizing a length of relatively small diameter, semi-permeable tubing formed from a synthetic polymer resin material, and contained within an enclosed chamber held under a reduced pressure or vacuum. The liquid to be degassed is transported through the enclosed chamber within the tubing fabricated from the semi-permeable polymer material. An example of such a vacuum degassing approach is described in U.S. Pat. No. 5,340,384, which is assigned to the same Assignee as in the present invention, and is herein incorporated by reference.

To effectuate the evacuation of the enclosed chamber of a vacuum degassing apparatus, pumps are typically employed in operable connection with such vacuum chambers. Although various pump types may be utilized, it has been found that single or multiple-stage positive-displacement pumps are best suited to create and maintain a desired level of reduced pressure within the vacuum degassing chamber. One issue that arises in the use of such pumps in vacuum degassing applications, however, is the presence of solvent vapor infiltrating the pump from the degassing vacuum chamber as a result of permeation of such solvent vapors through the semi-permeable membrane wall disposed in the chamber. If the concentration of the solvent vapor reaches a critical level, solvent condensation may occur, leading to operational and durability problems of the pump. For example, condensed solvent may cause a pump to "choke" and may also cause corrosion of metallic parts in the pump.

To minimize the likelihood of solvent vapor condensation within the pump, "flow restrictors" have been utilized to allow a small amount of air external to the pump to enter into, for example, the compression chambers of the pump so as to dilute the solvent vapor concentration below a critical condensation point. The vent flow rate of the air required to avoid such solvent condensation depends upon the solvent vapor pressure at the pump operating temperature, as well as the solvent permeability through the semi-permeable membrane utilized in the degassing operations in the vacuum chamber. Solvent permeability is unique for each solvent, and the solvent permeation rate approaches zero in situations where the solvent partial pressure inside the vacuum chamber is equal to the solvent vapor pressure at the chamber temperature. Under static flow conditions with the total chamber pressure below solvent vapor pressure, the partial pressure of solvent inside the chamber is equal to the total pressure. Under dynamic flow conditions, however, the amount of solvent permeating the membrane increases due to the introduction of entrained air into the chamber that reduces the solvent partial vapor pressure within the vacuum chamber. Solvent permeability may be calculated using the following equations:

$$p^p = p \times V^s / (V^s + V^{gas})$$

$$V^s = V_o^s \times (1 - p^p / p^s)$$

Wherein:
$p^p$—solvent partial pressure (mm Hg)
p—total pressure in the chamber (mm Hg)
$V^s$—solvent vapor total permeability (standard cm$^3$/minute)
$V_o^s$—solvent total permeability at conditions wherein the solvent partial pressure is zero (standard cm$^3$/minute)
$V^{gas}$—total vapor vent gas flow (standard cm$^3$/minute)
$p^s$—solvent vapor pressure at the pump exhaust temperature (mm Hg)

The vent gas flow rate required to prevent condensation in, for example, the compression chamber of the pump may be calculated by the following relationship:

$$V^{gas} = m^s \times 22,400 / MW^s \times (B/p^s - 1)$$

Wherein:
$m^s$=solvent total mass permeability (grams/minute)
$MW^s$=solvent molecular weight
B=barometric pressure (mm Hg)

Conventional vacuum pumps utilized in liquid degassing applications have commonly employed sintered porous frits as flow restrictors to control the infiltrating vent gas flow rate. An example of such a pump arrangement is shown and described in U.S. Pat. No. 6,494,938, which is assigned to the same assignee as in the present invention, and is incorporated herein by reference. Such sintered porous frits, however, present operational drawbacks and the potential for degradation over time. In particular, many of such sintered porous frits are fabricated from materials that are susceptible to corrosion from certain solvents and additives utilized in, for example, liquid chromatography mobile phases. Corrosion of such sintered porous frits manufactured from, for example, stainless steel, may cause significant and permanent changes in vent gas flow restriction. Such changes may be difficult to track over time, and may therefore degrade the accuracy and efficiency of the vacuum degassing operations unbeknownst to the system operator.

Moreover, the sintered porous frits commonly utilized in vacuum degassing applications contain pore sizes on the order of less than 1 μm. Due to the small size of the frit pores, particles may become lodged within the pores, thereby blocking or reducing vent gas passage therethrough. The small pore size can also lead to solvent vapor condensation within the pores, which can cause vent gas restriction and/or vapor condensation within the pumping cavities. In addition, such sintered porous frits are relatively expensive.

Accordingly, it is a principal object of the present invention to provide a mechanism for enabling controlled vent gas influx into a chamber of a pump utilized in reduced pressure degassing of liquids, without the use of sintered porous frits manufactured of corrosion-susceptible material, and/or those having mean pore sizes of less than 1 μm.

It is a further object of the present invention to provide a mechanism for enabling vent gas influx, which mechanism is relatively inexpensive.

SUMMARY OF THE INVENTION

By means of the present invention, dilution gas flow into targeted cavities of a pump utilized in combination with compression chamber vacuum degassing operations is facilitated without the drawbacks associated with porous frit flow restrictor mechanisms. Specifically, a continuous vent channel is provided that is defined by a continuous lumen within material that is resistant to corrosion from solvent vapors or other materials commonly present in liquid degassing operations. Moreover, the continuous vent channel provides a minimum cross-sectional area that is sufficiently large to minimize the likelihood of becoming plugged as a result of infiltration of particulate debris.

In a particular embodiment, the vacuum degassing apparatus of the present invention is configured for degassing one or more liquids, with the apparatus including a vacuum chamber, a liquid conveyance member disposed in the vacuum chamber for transporting the one or more liquid between an inlet and an outlet of the vacuum chamber, and a pump that is adapted to operably evacuate the vacuum chamber. The pump preferably includes a pumping cavity that is vented through a continuous vent channel. In preferred embodiments, the vent channel is formed by the lumen of a capillary tube that is fabricated from a non-metal material such as glass. In addition, a filter may be disposed at an inlet of the vent channel to further inhibit blockage of the vent channel by particulate matter.

In another embodiment of the present invention, a pump for use in operably evacuating a chamber in a vacuum degassing apparatus includes one or more pumping cavities that are in fluid communication with the chamber, and a continuous vent channel that has an outlet disposed in fluid communication with a respective one of the one or more pumping cavities. The vent channel is specifically configured to provide dilution gas flow into the pumping cavity at a rate sufficient to prevent solvent condensation in the pumping cavity.

DETAILED DESCRIPTION OF THE PREFERRED EMBODIMENTS

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
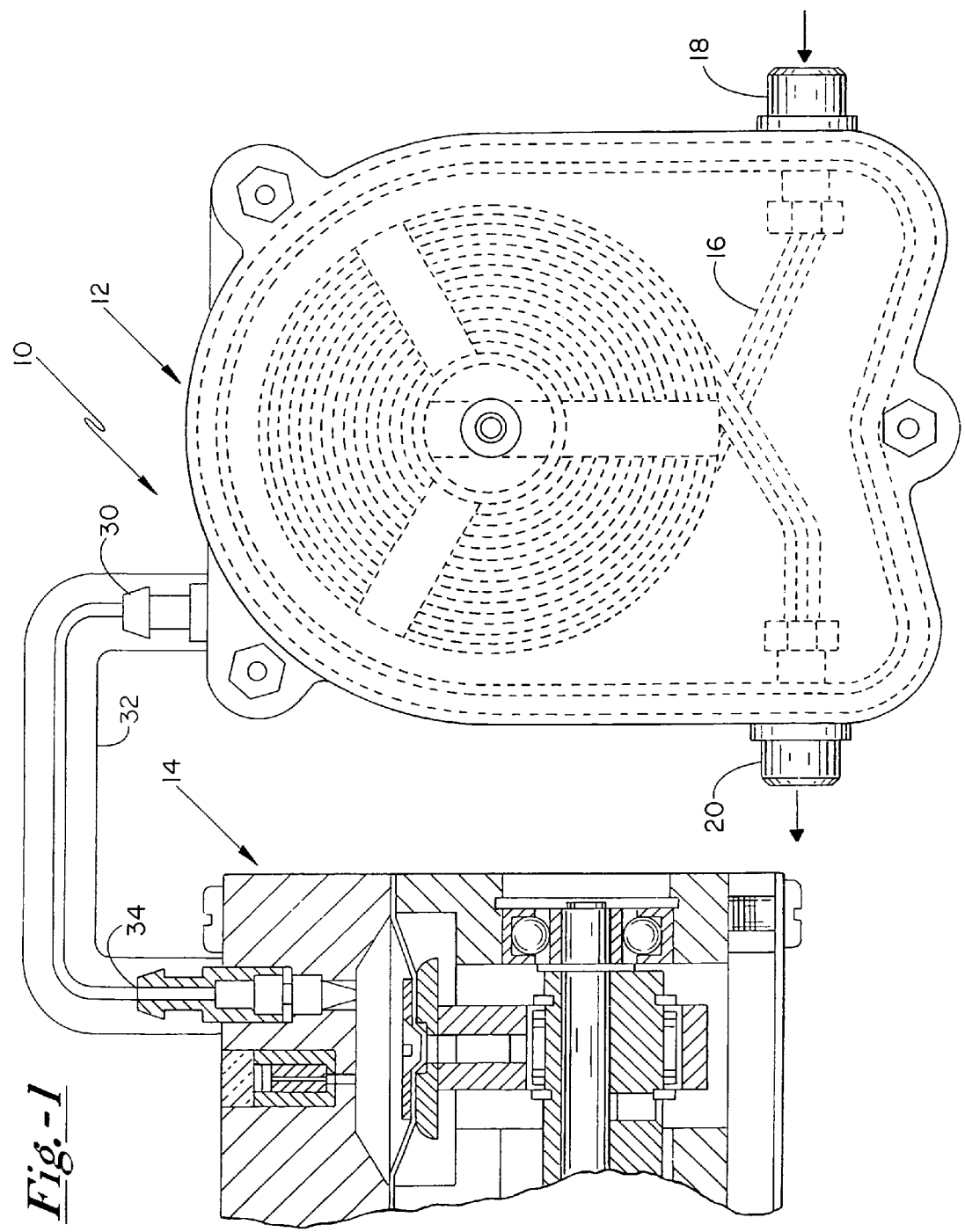
FIG. 1 is a schematic view of a vacuum degassing apparatus of the present invention.

With reference now to the drawing figures, and first to FIG. 1, vacuum degassing apparatus 10 includes a vacuum chamber 12 and a pump 14 that is adapted to operably evacuate vacuum chamber 12. Pump 14 is preferably in fluid communication with vacuum chamber 12 through vacuum line 32 that connects chamber port 30 to pump inlet 34. A liquid conveyance member 16 is disposed in vacuum chamber 12, and is configured to operably transport one or more liquids between inlet 18 and outlet 20 of vacuum chamber 12.

In preferred embodiments, liquid conveyance member 16 is fabricated from a gas-permeable, liquid-impermeable material that forms a semi-permeable membrane that facilitates the operable degasification of the liquids being conveyed. As is well known in the art, such degasification is accomplished by interposing liquid conveyance member 16 between the liquid to be degassed and a reduced pressure environment, such as that within vacuum chamber 12. In the embodiment illustrated in FIG. 1, therefore, liquid conveyance member 16 may take the form of tubing that defines one or more lumens that contain and transport liquid between inlet 18 and outlet 20 of vacuum chamber 12. In other embodiments, however, the liquid to be degassed may flow external to the liquid conveyance member, with a reduced pressure environment being provided within the one or more lumens defined within the liquid conveyance member.

In preferred embodiments, liquid conveyance member 16 is in the form of tubing fabricated from a gas-permeable, liquid-impermeable material. A particular example of such a material is an amorphous perfluorinated copolymer sold by E.I. du Pont de Nemours and Company of Wilmington, Del. under the trade name Teflon AF®. Such a material may be extruded or otherwise conventionally formed into a desired configuration, such as a tube. In other embodiments, liquid conveyance member 16 may be fabricated from a plurality of materials, such as PTFE, silicone rubber, and the like.

Pump 14 is operably adapted to evacuate vacuum chamber 12 by drawing gaseous and/or vapor substances out through chamber port 30 to pump exhaust 36. To effectuate such evacuation, pump 14 preferably incorporates a positive displacement mechanism, such as that illustrated in greater detail in FIG. 2. As illustrated therein, pump 14 is a two stage, series diaphragm pumping mechanism. A manifold 50 includes a first stage head 52 and a second stage head 54 that are in fluid communication with one another through transfer line 56. Manifold 50 preferably further includes intake and outlet duckbill check valves 60, 62 associated with pump inlet 34 and pump exhaust 36, respectively. Such check valves 60, 62 regulate the flow direction from vacuum line 32 into pump 14 at inlet 34 and ultimately out from pump 14 at exhaust 36. In addition, transfer duckbill check valve 64 is provided in transfer line 56 so as to regulate flow to pass only from the first stage to the second stage, and not the reverse.

Motor 132 is operably coupled to pump 14 through a drive shaft 130 to rotatably drive rods 118, 128 in reciprocal motion within first and second pumping cavities 72, 74, respectively. Preferably, first and second rods 118, 128 are coupled to drive shaft 130 at opposed eccentric cam portions 137, 139, such that the reciprocal motion of rods 118, 128 are preferably 180° out of phase with respect to one another. Motor 132 is preferably any conventional motor that is capable of providing, for example, rotational motion to drive shaft 130. A particular example of a motor useful in vacuum degassing apparatus 10 of the present invention is a brushless DC stepper motor.

Figure 2:
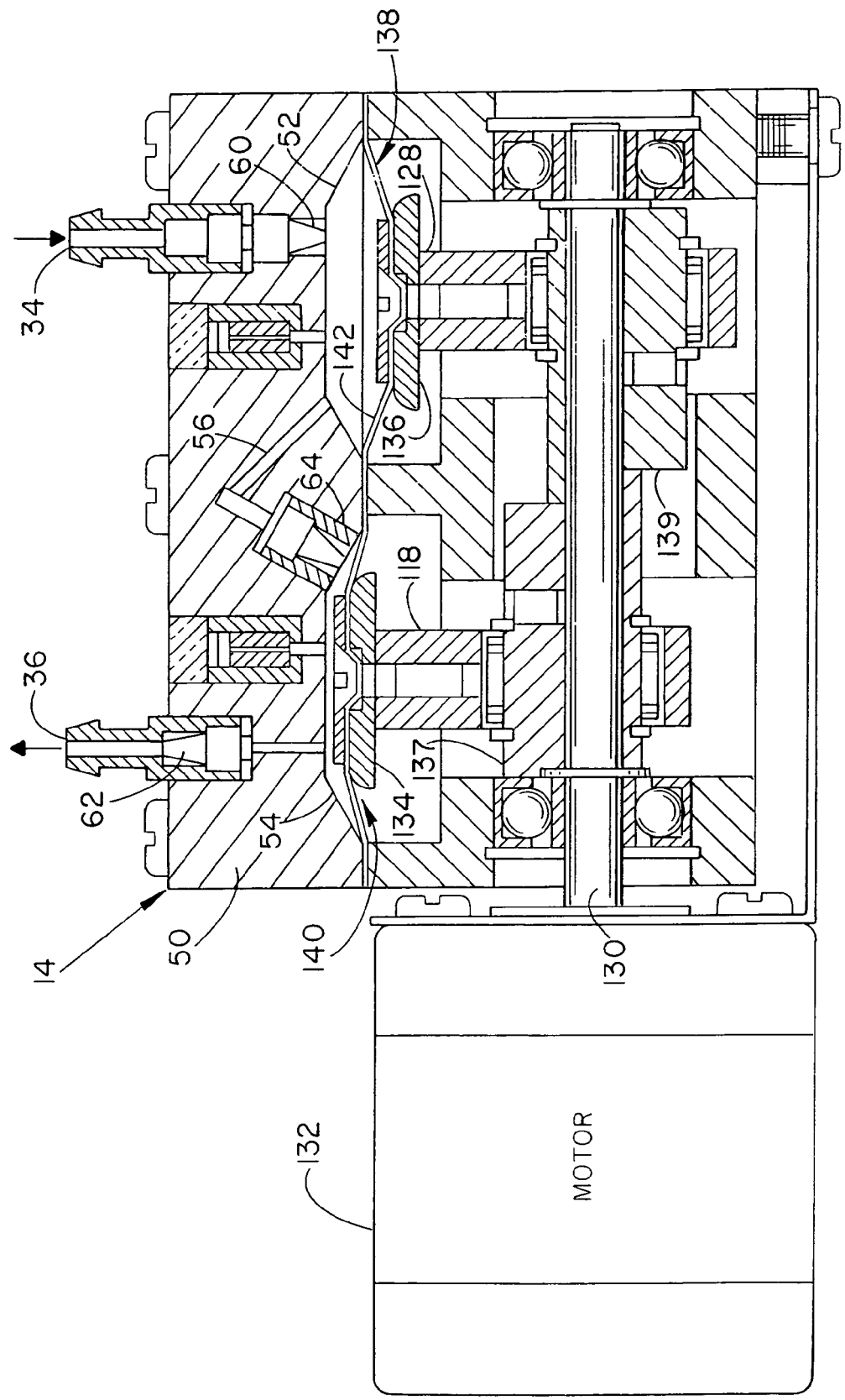
FIG. 2 is a side cross-sectional view of a portion of the vacuum degassing apparatus illustrated in FIG. 1.

In the embodiment illustrated in FIG. 2, rods 118, 128 are preferably coupled to respective piston heads 134, 136, that engage diaphragm 142. Piston heads 134, 136 therefore reciprocate respective portions of diaphragm 142 between an intake position 138 and an exhaust position 140. Although diaphragm 142 may be fabricated from a variety of materials, a preferred design of diaphragm 142 incorporates a membrane material of PTFE or the like.

Figure 3:
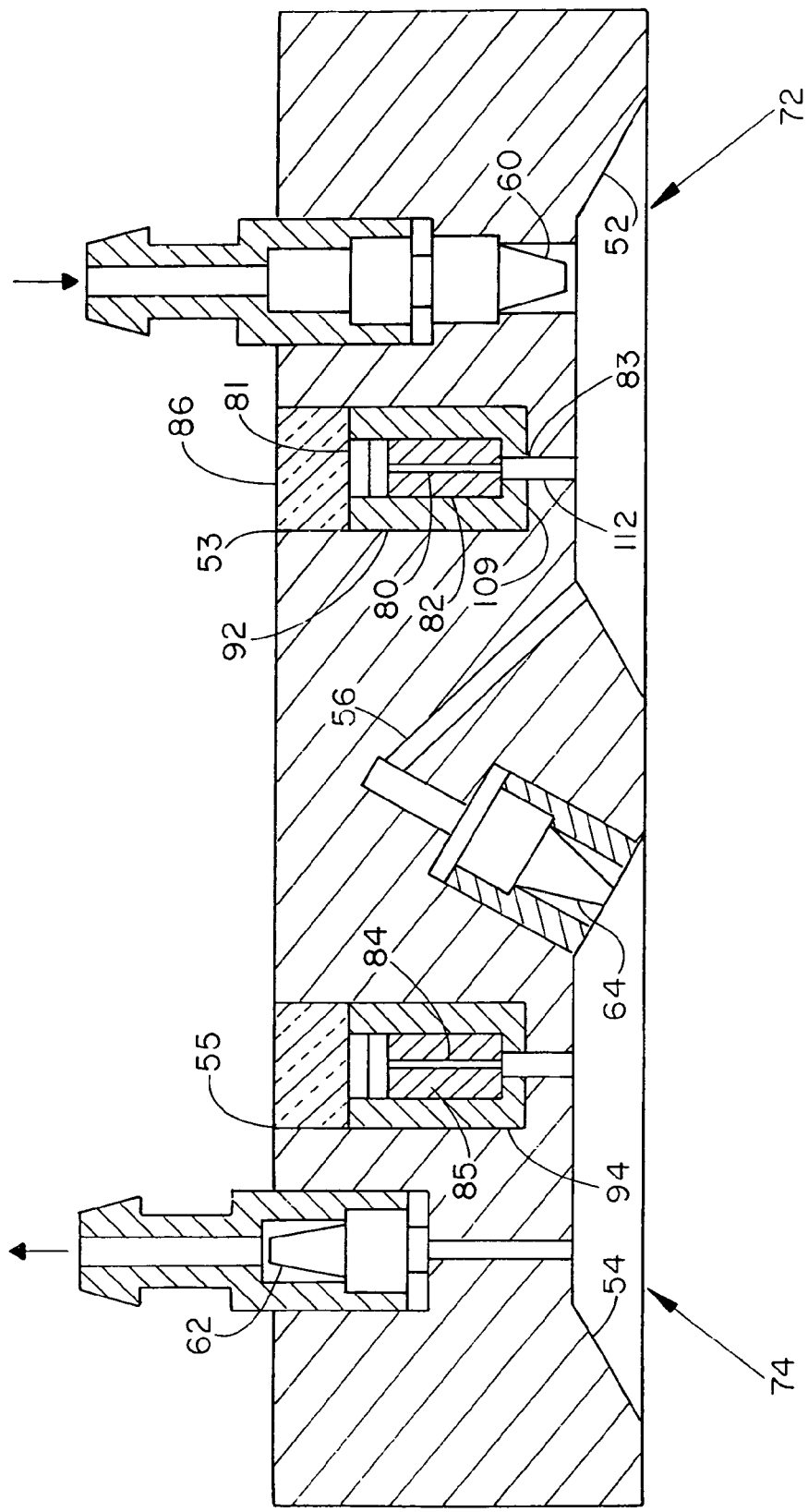
FIG. 3 is a side cross-sectional view of a portion of the vacuum degassing apparatus illustrated in FIGS. 1 and 2.

In a preferred aspect of the present invention, a first vent channel 80 is disposed in first stage head 52 to enable dilution gas inlet into first pumping cavity 72 from, for example, the ambient environment external to pump 14. As best illustrated in FIG. 3, first vent channel 80 is preferably formed by the lumen of a capillary tube 82. The lumen of capillary tube 82 is preferably a continuous channel having a minimum cross-sectional diameter of at least about 10 μm, and more preferably between about 25 and about 150 μm. The selection of capillary tube 82 to provide a vent channel lumen of adequate but not excessively large size is based on the required dilution gas flow rate defined in the relationships described above with respect to the prevention of condensation in pumping cavity 72 based upon a "worst case" solvent material, and is typically within about 10-20% of total flow through first pumping cavity 72. Typically, the sizes selected for capillary tube 82, and thus first vent channel 80, effect the performance of pump 14 by between about 2.5 and 3 mm Hg per standard $cm^3$ of flow through first pumping cavity 72. As a result, the size of first vent channel 80 is dependent upon the total gas/vapor flow through first compression chamber 72. By way of example, vacuum degassing apparatus utilized in analytical-scale chromatography systems may involve capillary tubes having bore sizes between about 25 and 80 μm, while those utilized in prepatory-scale chromatography systems may have bore sizes between about 50 and 150 μm. Such vent channel sizes have significantly more success in remaining free of plugs caused by contaminant particles. Moreover, even in events wherein condensed fluid blocks first vent channel 80, the resumption of operation of pump 14 typically clears the restriction. Moreover, capillary tube 82 is preferably fabricated from a non-metal material, such as glass. Borosilicate glass capillary tubes of the sizes useful in applications of the present invention are available from Vitrocom, Inc. of Mountain Lakes, N.J. The non-metal material of capillary tube 82 results in desired corrosion resistance properties that significantly reduces degradation of first vent channel 80 over time as a result of solvent or reactive vapor attack.

In addition to the above, capillary tubes, such as those utilized in capillary tube 82, are significantly less expensive than sintered porous frits that have been utilized as dilution gas flow restrictors in the past. Such cost savings are particularly evident in comparing the cost of capillary tubes to sintered porous frits having pore sizes on the order of less than 1 μm, as is typically required in applications of the prior art. Accordingly, the selection of capillary tubes in forming a dilution vent channel brings a variety of advantages over the materials and devices previously utilized in vacuum pumps incorporated in vacuum degassing apparatus.

In the illustrated embodiments, capillary tube 82 is disposed in a bore 53 of first stage head 52. To properly seat capillary tube 82 within bore 53, a first sleeve member 92 may be seated in bore 53 to define a receptacle within which capillary tube 82 may be retained, such as through compressive-frictional forces. First sleeve member 92 is preferably a chemically-resistant and resilient material to properly position and retain capillary tube 82 within bore 53 of first stage head 52. First sleeve member 92, therefore, may be fabricated from, for example, polypropylene or other polymeric or non-polymeric materials fitting the above description. First sleeve member 92 preferably at least partially circumferentially surrounds capillary tube 82, and provides an axial cushion and air-tight seal between capillary tube 82 and base portion 109 of bore 53. In such a manner, capillary tube 82 is securely positioned and sealably engaged within first stage head 52, and insulated from damage that may be caused by vibrations or other impacts to pump 14.

As further illustrated in FIG. 3, bore 53 may be disposed in first stage head 52 at a position spaced from first pumping cavity 72, such that first pumping cavity 72 is in fluid communication with bore 53 through first access bore 112. First access bore 112 likewise fluidly couples first pumping cavity 72 to the lumen defined by capillary tube 82. First access bore 112 is required in embodiments incorporating base 109 of bore 53. In other embodiments, bore 53 may extend completely through first stage head 52 without defining a base 109, such that first sleeve member 92 compressively and sealably retains capillary tube 82 in a desired position immediately adjacent to first pumping cavity 72.

A further optional feature in the present invention is the use of a first sintered porous frit 86 axially positioned in bore 53 with respect to capillary tube 82. In this embodiment, first porous frit 86 is utilized as a filter to prevent incoming debris from entering into, and potentially clogging, the lumen defined by capillary tube 82. To effectively act as a filter, therefore, the minimum pore size of first porous frit 86 is preferably less than the cross-sectional diameter of the lumen defined by capillary tube 82. It is also, however, a goal of the present invention to avoid the drawbacks of the prior art use of porous frits, such that the minimum pore size of first porous frit 86 is at least about 10 μm, and more preferably between about 10 and 25 μm. Accordingly, first porous frit 86 prevents particulate matter having a mean diameter of greater than between about 10 and 25 μm from entering into the lumen defined by capillary tube 82.

As shown in FIG. 3, first porous frit 86 is preferably configured to be press fit within bore 53, such that first porous frit 86 axially abuts first sleeve member 92 to resiliently seat first porous frit 86 within first stage head 52. In preferred embodiments, first porous frit 86 is fabricated from a corrosion-resistant material, such as polypropylene or the like. Other materials for first porous frit 86, however, may be utilized. As described above, therefore, first porous frit 86 is disposed at inlet 81 of first vent channel 80 so as to act as a filter to incoming debris, such that dilution gas flow entering first pumping cavity 72 from outlet 83 of first vent channel 80 is maintained at a desired rate, and substantially free from particulate debris.

As further shown in the illustrated embodiments, pump 14 may include a second vent channel 84 in second stage head 54, with second vent channel 84 being defined by a second capillary tube 85 disposed in bore 55 of second stage head 54. Second vent channel 84 may be arranged as that described above with respect to first vent channel 80, including a second sleeve member 94 compressively and sealably retaining second capillary tube 85 within bore 55. No requirement, however, that first and second vent channels 80, 84 be of identical construction and configuration is intended to be implied through the above. On the contrary, first and second vent channels 80, 84 may be constructed with different sizes, materials, and/or components to suit the particular application employed.

Although transfer line 56 fluidly coupling first pumping cavity 72 to second pumping cavity 74 is illustrated as being fully contained within manifold 50 of pump 14, such a transfer line may instead extend at least partially external to pump 14, as warranted per the pump design. Moreover, pump 14 may include more or less than two stages like that illustrated in FIGS. 1-3.

It is further contemplated by the present invention that a vent channel as described above may be positioned at any of a number of pumping cavities in pump 14 that are in fluid communication with vacuum degassing chamber 12.

Although first and second pumping cavities 72, 74, which form compression chambers, are examples of such pumping cavities, other pumping cavities in pump 14 may be vented through the continuous vent channel of the present invention that is defined by the lumen of a capillary tube. For example, pumping cavities in pump 14 that could optionally be vented through the vent configuration of the present invention include the transfer line 56 and pump inlet 34.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A vacuum degassing apparatus for degassing one or more liquids, said apparatus comprising:
    (a) a vacuum chamber;
    (b) a liquid conveyance member disposed in said vacuum chamber and configured for operably transporting one or more liquids between an inlet and an outlet of said vacuum chamber; and
    (c) a pump adapted to operably evacuate said vacuum chamber, said pump having a pumping cavity that is vented through a continuous vent channel formed by a capillary tube lumen.

2. A vacuum degassing apparatus as in claim 1 wherein said vent channel is disposed in a head portion of said pump.

3. A vacuum degassing apparatus as in claim 1 wherein said vent channel has a minimum cross-sectional diameter of at least about 10 μm.

4. A vacuum degassing apparatus as in claim 1 wherein said capillary tube is fabricated from a non-metal material.

5. A vacuum degassing apparatus as in claim 1 wherein said capillary tube is fabricated from glass.

6. A vacuum degassing apparatus as in claim 1, including a filter disposed at an inlet of said vent channel.

7. A vacuum degassing apparatus as in claim 6 wherein an outlet of said vent channel is immediately adjacent to said pumping cavity.

8. A vacuum degassing apparatus as in claim 6 wherein said filter is a sintered porous frit having a minimum pore size of about 10 μm.

9. A vacuum degassing apparatus as in claim 1 wherein said pumping cavity is selected from the group consisting of a compression chamber and an inlet chamber.

10. A vacuum degassing apparatus as in claim 9 wherein a continuous vent channel is disposed at each of said inlet chamber and at least one compression chamber.

11. A pump for use in operably evacuating a chamber in a vacuum degassing apparatus, said pump comprising:
    (a) one or more pumping cavities in fluid communication with said chamber; and
    (b) a continuous vent channel having an outlet disposed in fluid communication with a respective one of said one or more pumping cavities, said vent channel being configured to provide dilution gas flow into said pumping cavity at a rate sufficient to prevent solvent condensation in said pumping cavity, said sufficient gas flow rate is defined by:

$$V^{gas} \times m^s \times 22{,}400/MW^s \times (B/(p^s-1)).$$

12. A pump as in claim 11 wherein said vent channel has a minimum cross-sectional diameter of at least about 10 μm.

13. A pump as in claim 11 wherein said one or more pumping cavities are selected from the group consisting of a compression chamber and an inlet chamber.

14. A pump as in claim 13 wherein a continuous vent channel is disposed at each of said inlet chamber and at least one compression chamber.

\* \* \* \* \*

UNITED STATES PATENT AND TRADEMARK OFFICE
CERTIFICATE OF CORRECTION

| | | |
|---|---|---|
| PATENT NO. | : 7,399,345 B2 | Page 1 of 1 |
| APPLICATION NO. | : 11/430711 | |
| DATED | : July 15, 2008 | |
| INVENTOR(S) | : Yuri Gerner | |

It is certified that error appears in the above-identified patent and that said Letters Patent is hereby corrected as shown below:

Claim 11, column 8, line 27, replace "$V^{gas}xm^s x22,400/MW^s x(B/(p^s-1))$" with -- $V^{gas}=m^s x22,400/MW^s x(B/(p^s-1))$ --.

Signed and Sealed this

Second Day of September, 2008

JON W. DUDAS
*Director of the United States Patent and Trademark Office*